US012241241B2

United States Patent
Hazelton et al.

(10) Patent No.: US 12,241,241 B2
(45) Date of Patent: Mar. 4, 2025

(54) DRAIN PROTECTOR

(71) Applicant: Helen of Troy Limited, St. Michael (BB)

(72) Inventors: Lance E. Hazelton, Maplewood, NJ (US); Mathieu Zastawny, Jersey City, NJ (US); Yoon Jung Heo, Fort Lee, NJ (US); Dio Climaco Cavero, North Merrick, NY (US); Zachary Z. Nelkin, Englewood, NJ (US); Daniel Juda, Brooklyn, NY (US)

(73) Assignee: HELEN OF TROY LIMITED, St. Michael (BB)

( * ) Notice: Subject to any disclaimer, the term of this patent is extended or adjusted under 35 U.S.C. 154(b) by 981 days.

(21) Appl. No.: 17/242,850

(22) Filed: Apr. 28, 2021

(65) Prior Publication Data

US 2022/0349165 A1    Nov. 3, 2022

(51) Int. Cl.
| | |
|---|---|
| *E03C 1/264* | (2006.01) |
| *B01D 29/35* | (2006.01) |
| *B01D 29/50* | (2006.01) |
| *B01D 29/96* | (2006.01) |
| *B01D 35/02* | (2006.01) |

(Continued)

(52) U.S. Cl.
CPC .............. *E03C 1/264* (2013.01); *B01D 29/35* (2013.01); *B01D 29/50* (2013.01); *B01D 29/96* (2013.01); *B01D 35/02* (2013.01); *B01D 35/16* (2013.01); *C02F 1/001* (2013.01); *B01D 2201/34* (2013.01); *C02F 2103/42* (2013.01)

(58) Field of Classification Search
CPC ........... E03C 1/26; E03C 1/264; B01D 29/35; B01D 29/50; B01D 29/96; B01D 35/02

USPC ...................................................... 4/286–292
See application file for complete search history.

(56) References Cited

U.S. PATENT DOCUMENTS 1,757,977 A * 5/1930 Salvatore ................ E03C 1/264
                                                              4/292
1,770,639 A    7/1930 West et al.
(Continued)

FOREIGN PATENT DOCUMENTS

EP    1600566    11/2005
GB    2478146    8/2011
(Continued)

OTHER PUBLICATIONS

JP2008267041A Machine Translation (Year: 2024).*
(Continued)

*Primary Examiner* — Erin Deery
*Assistant Examiner* — William R Klotz
(74) *Attorney, Agent, or Firm* — RANKIN, HILL & CLARK LLP (57) ABSTRACT

A drain protector includes a basket and a wiper. The basket includes a basket body having first water openings. The basket body includes a seal at an upper first end and a retention member at a lower second end. The basket body is sized to be received in an associated drain, the seal for directly sealingly engaging an outer surface of the associated drain, and the retention member for directly engaging an inner surface of the associated drain. The wiper includes a wiper body having second water openings. The wiper body is removably mounted within the basket body for entrapping debris within water and removing the debris from within the basket body.

18 Claims, 6 Drawing Sheets

(51) Int. Cl.
  *B01D 35/16* (2006.01)
  *C02F 1/00* (2023.01)
  *C02F 103/42* (2006.01)

(56) References Cited

U.S. PATENT DOCUMENTS

| | | | | |
|---|---|---|---|---|
| 1,996,279 | A * | 4/1935 | Dillon | E03C 1/264 |
| | | | | D23/209 |
| 2,909,788 | A * | 10/1959 | Van Der Bel | E03C 1/264 |
| | | | | 4/256.1 |
| 3,665,526 | A | 5/1972 | Hoffman | |
| 4,134,162 | A * | 1/1979 | Sharland | E03C 1/264 |
| | | | | 4/293 |
| 4,160,293 | A * | 7/1979 | Niemann | E03C 1/262 |
| | | | | 4/291 |
| 4,932,082 | A | 6/1990 | Ridgeway | |
| 6,276,000 | B1 * | 8/2001 | Saman | E03C 1/262 |
| | | | | 4/295 |
| 6,487,729 | B2 | 12/2002 | Delanzo | |
| 7,032,253 | B2 * | 4/2006 | Colpitts | E03C 1/2306 |
| | | | | 4/287 |
| 8,168,065 | B1 * | 5/2012 | Gavigan | C02F 1/76 |
| | | | | 210/167.11 |
| 9,015,876 | B2 * | 4/2015 | Ball | E03C 1/22 |
| | | | | 285/46 |
| 10,024,039 | B2 * | 7/2018 | Cheng | E03C 1/264 |
| 10,501,917 | B2 | 12/2019 | Ali et al. | |
| 10,570,594 | B2 | 2/2020 | Karnegie et al. | |
| D905,206 | S * | 12/2020 | Colacino | D23/261 |
| 11,019,965 | B2 * | 6/2021 | Beck | E03C 1/22 |
| 2010/0071122 | A1 * | 3/2010 | Li | E03C 1/262 |
| | | | | 4/287 |
| 2018/0106025 | A1 | 4/2018 | Schuster | |
| 2018/0263426 | A1 | 9/2018 | Ahuja et al. | |
| 2021/0395986 | A1 * | 12/2021 | Ahuja | A47K 1/14 |
| 2022/0341139 | A1 * | 10/2022 | Yazdani | E03C 1/264 |

FOREIGN PATENT DOCUMENTS

| | | |
|---|---|---|
| JP | H1088638 | 4/1998 |
| JP | 2005083118 | 3/2005 |
| JP | 2008267041 A * | 11/2008 |
| JP | 4556731 | 10/2010 |
| JP | 5262814 | 8/2013 |
| KR | 101470259 B1 * | 12/2014 |
| KR | 20170075463 A * | 7/2017 |

OTHER PUBLICATIONS

KR20170075463A Machine Translation (Year: 2024).*
KR-101470259-B1 Machine Translation (Year: 2024).*
https://www.oxo.com/silicone-shower-tub-drain-protector.html, publicly available prior to Apr. 28, 2021 (retrieved from the internet Apr. 28, 2021).
https://www.oxo.com/shower-stall-drain-protector.html, publicly available prior to Apr. 28, 2021 (retrieved from the Internet Apr. 28, 2021).
https://www.oxo.com/categories/cleaning-organization/kitchen/sinkware/silicone-sink-strainer.html, publicly available prior to Apr. 28, 2021 (retrieved from the internet Apr. 28, 2021).

* cited by examiner

DRAIN PROTECTOR

BACKGROUND

Bathtubs and showers include a drain flange installed in a drain that typically includes a lattice type filter that strains hair and other debris out of drain water. However, the filter of the drain flange is insufficient allowing hair and other debris to flow past the filter, thereby causing clogging or other drainage problems as hair and other debris accumulates in pipes or other areas of plumbing. Clearing stoppages created by an abundance of hair usually requires pouring harmful drain opening chemicals or snaking the plumbing. Accordingly, it would be desirable to provide a drain protector that avoids these and other problems.

SUMMARY

According to one aspect, a drain protector comprises a basket and a wiper. The basket includes a basket body having first water openings. The basket body includes a seal at an upper first end and a retention member at a lower second end. The basket body is sized to be received in an associated drain, the seal for directly sealingly engaging an outer surface of the associated drain, and the retention member for directly engaging an inner surface of the associated drain. The wiper includes a wiper body having second water openings. The wiper body is removably mounted within the basket body for entrapping debris within water and removing the debris from within the basket body.

According to another aspect, a drain protector for covering a drain flange around an opening of an associated drain in an associated shower or bathtub and for straining hair out of drain water is provided. The drain protector comprises a basket and a wiper. The basket includes a perforated basket body having an upper first end provided with a seal for sealingly engaging the drain flange of the associated drain and a lower second end provided with a retention member for engaging an inner surface of the associated drain. The wiper includes a perforated wiper body removably mounted within the basket body for removing hair entrapped within the basket body. The wiper includes a cap spaced above the upper first end of the basket body for covering the upper first end.

DETAILED DESCRIPTION

It should, of course, be understood that the description and drawings herein are merely illustrative and that various modifications and changes can be made in the structures disclosed without departing from the present disclosure. Further, spatially relative terms, such as "upper" and "lower", describe to the invention as oriented in the figures.

Referring now to the drawings, wherein like numerals refer to like parts throughout the several views, FIGS. 1-5 illustrate a drain protector 100 according to the present disclosure which is configured to strain water draining from a basin (e.g., a bathtub, a shower, a sink, or similar component) to collect debris, such as hair, before the debris is able to pass into any plumbing. The drain protector 100 generally comprises a basket 102 and a wiper 104. The basket 102 includes a basket body 110 having a sidewall 112 and a bottom wall 114. In the depicted aspect, the sidewall 112 is substantially cylindrical shaped with an upper, first end or end portion 120 and a lower, second end or end portion 122. The first end 120 defines an upper opening 124 and the second end 122 defines a lower opening 126, thereby forming a hollow core surrounded by the sidewall 112 (i.e., a generally tubular shaped basket body 110). The basket body 110 is perforated, wherein one or more first openings 130 extend through the sidewall 112 for straining water flowing into the drain while entrapping debris, such as hair, at or near the first openings 130. The first openings 130 may have a shape to facilitate capturing hair or other debris. The bottom wall 114 is surrounded by the sidewall 112, and is spaced upwardly from the second end 122.

Figure 1:
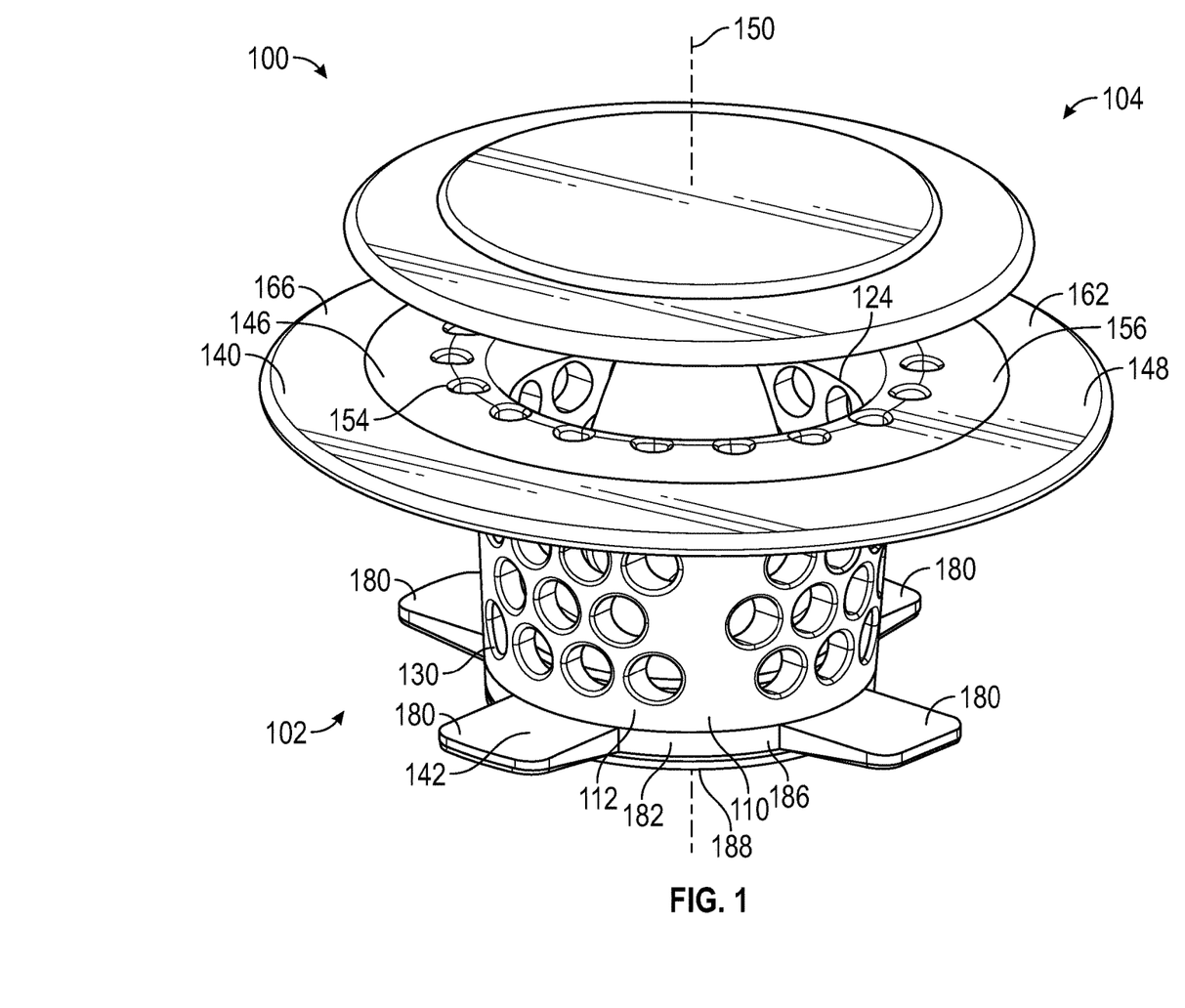
FIG. 1 is a perspective view of a drain protector according to the present disclosure, the exemplary drain protector including a basket and a wiper adapted to be removably mounted within the basket.
Figure 2:
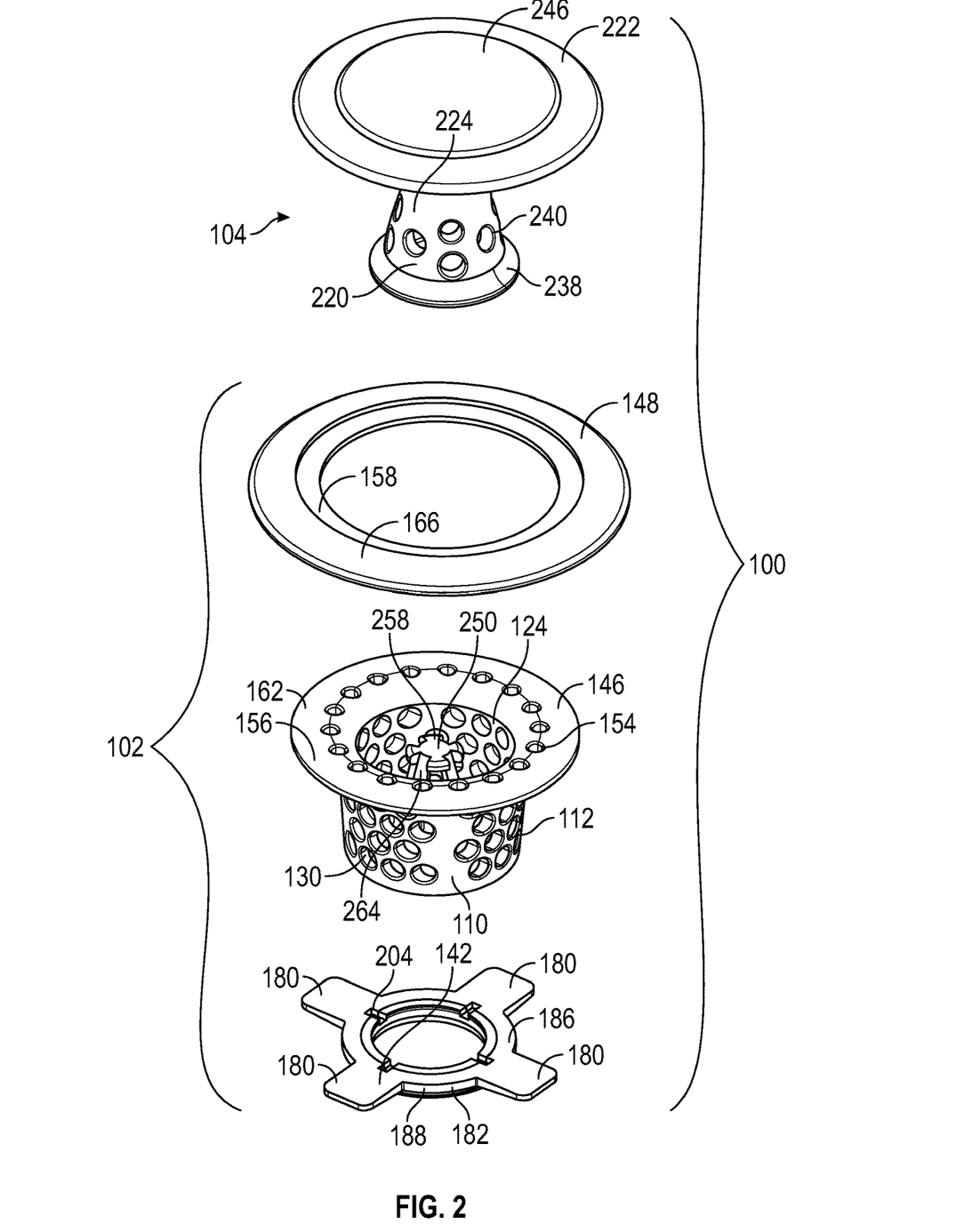
FIG. 2 is an exploded perspective view of the drain protector.
Figure 3:
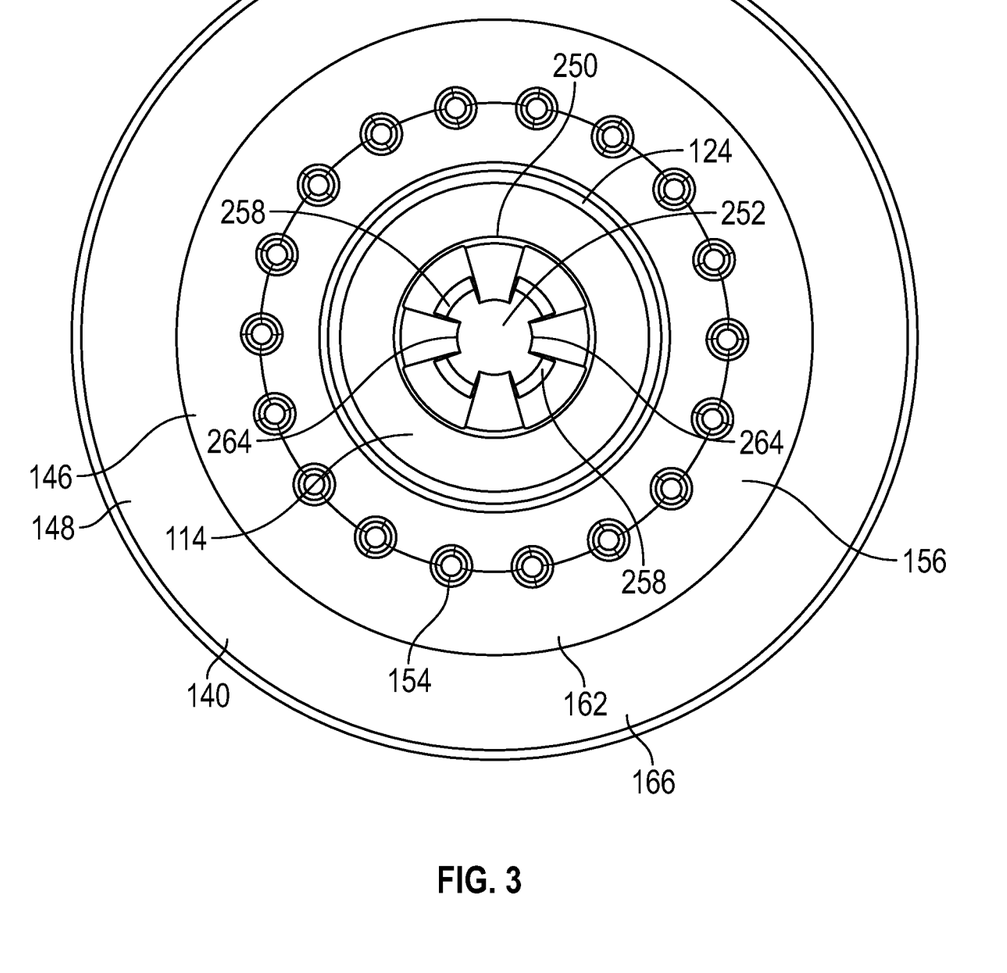
FIG. 3 is a top view of the basket of the drain protector.
Figure 4:
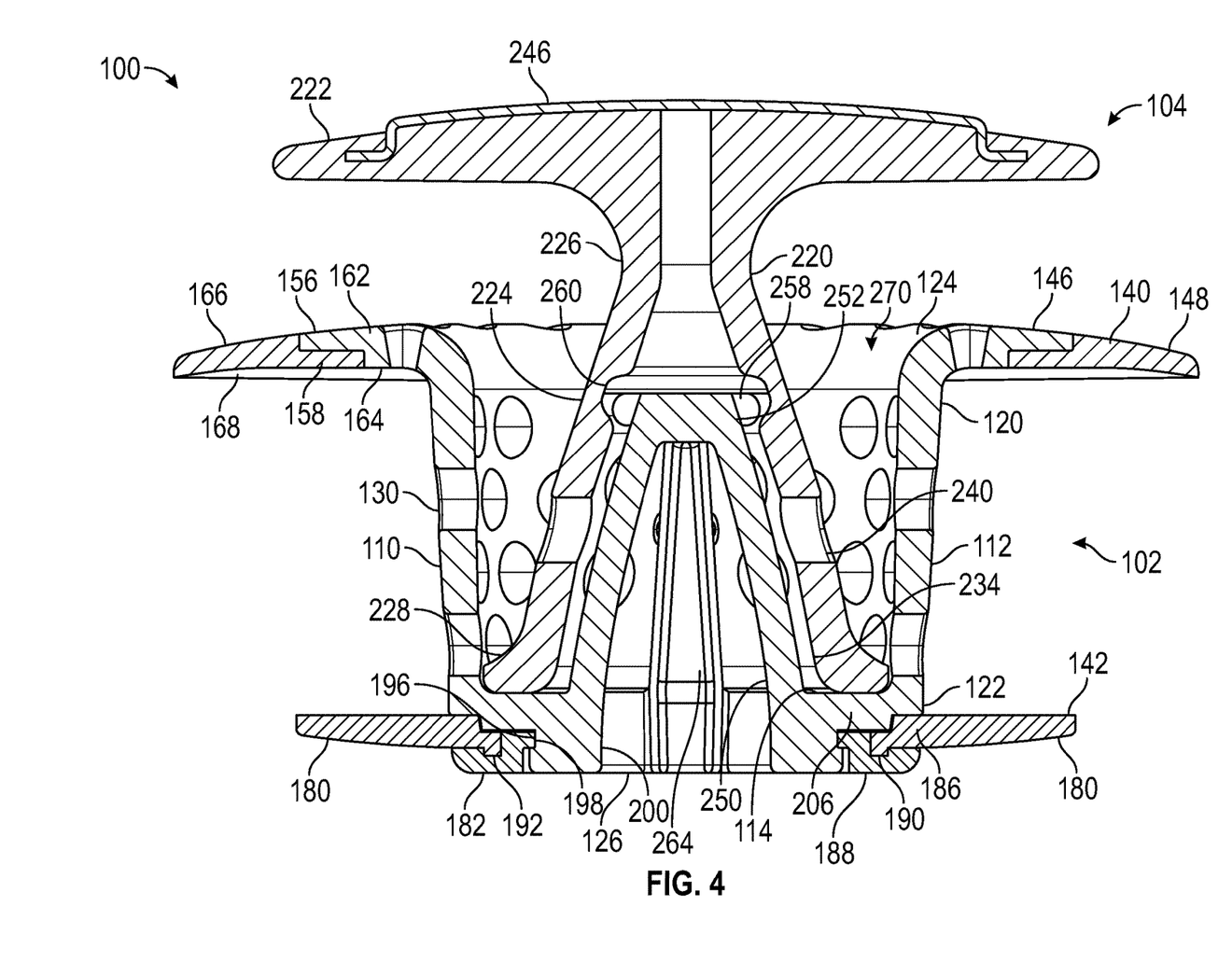
FIG. 4 is a cross-sectional view of the drain protector.
Figure 5:
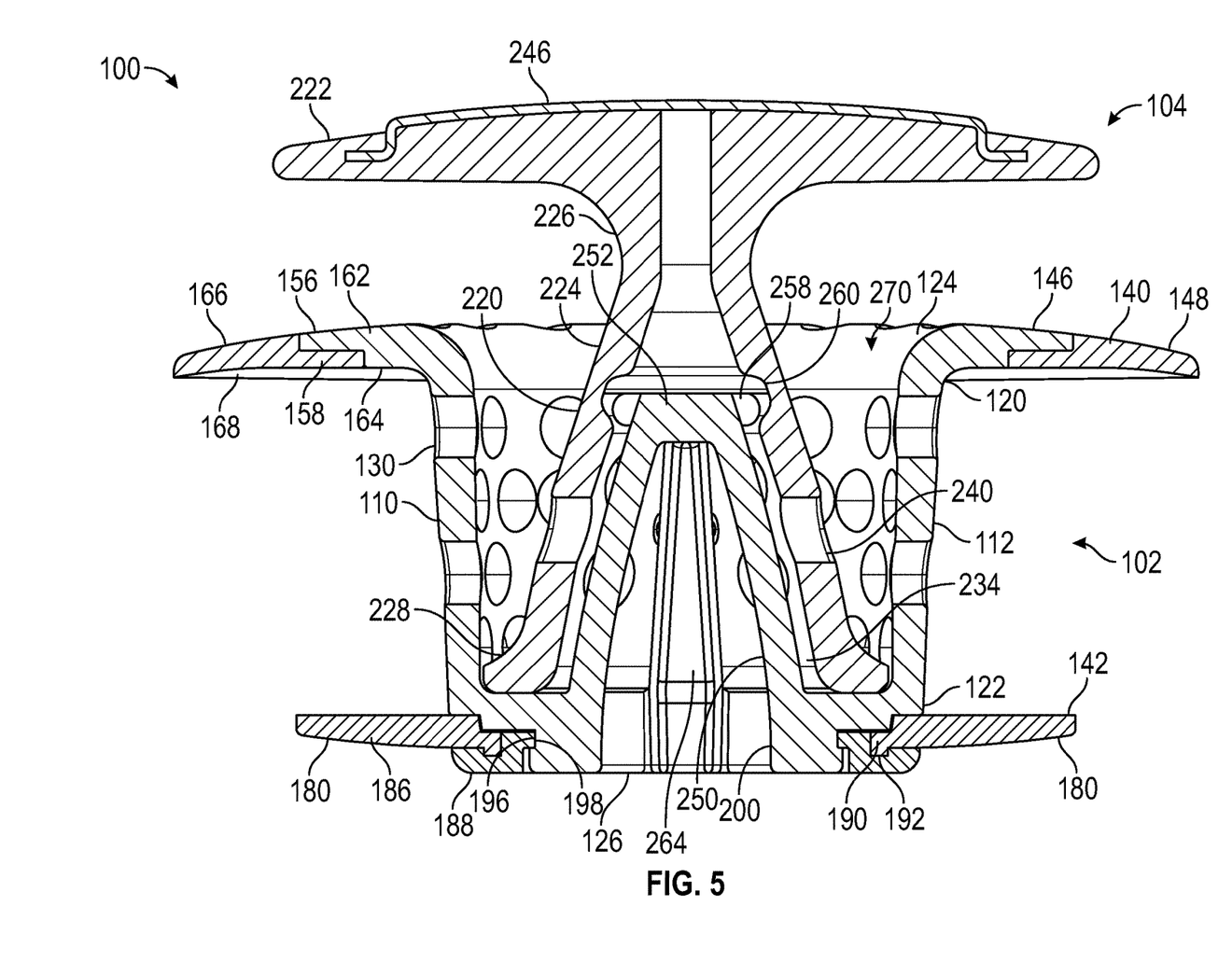
FIG. 5 is another cross-section view of the drain protector

The basket body 110 further includes a seal 140 at the first end 120 and a retention member 142 at the second opposite end 122. As shown, the seal 140 extends radially outwardly from the first end 120 relative to a longitudinal axis 150 of the drain protector 100, and can be a two part seal with a first seal part 146 and a second seal part 148. In the depicted aspect, the first seal part is formed integral with the sidewall 112 to define a unitary component. Drain openings 154 can extend through the first seal part 146 at a location closer to the sidewall 112 as compared to an edge portion 156 of the first seal part 146. Although, it should be appreciated that the first seal part can be devoid of the drain openings. The second seal part 148 is ring shaped and includes a stepped portion 158 sized to receive the edge portion 156 of the first seal part 146. In FIGS. 4 and 5, the edge portion 156 is stepped to mate with the stepped portion 158. Therefore, when assembled upper and lower surfaces 162 and 164 of the first seal part 146 are continuous and flush with respective upper and lower surfaces 166 and 168 and the second seal part 148. It should be appreciated that the seal 140 can be a single part seal integrally formed with the sidewall 112 without departing from the scope of the present disclosure.

The retention member 142 is provided for centering and retaining the basket body 110 within the drain. In the depicted embodiment, the retention member 142 can be defined by flexible tabs 180 extended radially from the second end 122 relative to the longitudinal axis 150 of the drain protector 100, the tabs directly engaging an inner surface of the drain. As depicted, the tabs 180 can be part of a separate ring member 182 mounted to the second end 122 of the basket body 110. Particularly, the ring member 182 is a two piece ring member including a first ring member part or retention part 186 having the tabs 180 integrally formed therewith and a second ring member part or base part 188. In assembly of the retention member 142, an annular ridge 190 depending from the retention part 186 is received in an annular groove 192 formed in the base part 188. The base part 188 includes an inward radial ledge 196 that is received in an annular channel 198 formed on, for example, an axial extension part 200 of the lower, second end 122 of the basket body 110. Further, to allow for proper alignment of the ring member 182 on the basket body 110, at least one notch 204 is formed on the retention part 186 which receives at least one locating tab 206 depending from the bottom wall 114. It should be appreciated that the instead of the ring member 182 being separate from the basket body 110, the ring member 182 can be integral with the basket body 110 such that the retention member 142 is integral with the basket 102. It should further be appreciated that alternative configurations for the retention member 142 for centering and retaining the basket body 110 within the drain are contemplated. For example, the tabs 180 with the ring member 182 can be replaced with a retention member 142 having elongated fins formed on the sidewall 112 of the basket body 110 for directly engaging an inner surface of the drain.

With continued reference to FIGS. 1-5, the wiper 104 includes a wiper body 220 and a cap 222 provided atop the wiper body. In the depicted aspect, the wiper body 220 includes a sidewall 224. The sidewall 224 can have an inverted conical shape in side view with a narrow upper, first end or end portion 226 and a lower, second end or end portion 228 opposite the first end 226. The second end 228 defines a lower opening 234 for a hollow core surrounded by the sidewall 224. Further, the second end 228 may include a circular edge 238 having a diameter similar to or otherwise substantially conforming to an internal diameter of the basket body 110 at the second end 122, thereby creating a friction fit or an interference fit with the inner surface of the sidewall 112 of the basket body 110. The wiper body 220 is perforated, wherein one or more second water openings 240 extend through the sidewall 224 for straining water flowing into the drain while entrapping debris, such as hair, at or near the second openings 240. Similar to the first openings 130, the second openings 240 may have a shape to facilitate capturing hair or other debris. The cap 222 is substantially disk or plate-shaped and can include a decorative cover 246 that may be coated or otherwise formed to have a common bathroom aesthetic, such as stainless steel, chrome, brushed nickel, or other material.

As indicated previously, the wiper 104 is removably mounted within the basket 102 for entrapping hair and other debris within water and removing the hair and other debris from within the basket body 110. To this end, a mounting feature is provided within the basket body 110. In the present aspect, the mounting feature is a post 250 extending from the bottom wall 114. In FIGS. 4 and 5, the post 250 is integral with the bottom wall 114 and has a free end portion 252 closer to the first end 120 of the sidewall 112 as compared to the second end 122. The post 250 can have an inverted conical shape similar to that of the wiper body 220, which can provide stability to the wiper 104 and maintain the position of the wiper 104 within the basket 102; although this is not required. The free end portion 252 of the post 250 is adapted for engaging the wiper body 220. By way of example, the free end portion 252 of the post 250 includes at least one protuberance or tab 258 extended therefrom, and an inner surface of the sidewall 224 of the wiper body 220 has a groove 260 formed therein for receiving the at least one tab 258. This connection arrangement allows for the ease of mounting the wiper to and removing the wiper from the basket. Further, in FIGS. 2 and 3 the post 250 can include at least one slotted opening 264 for the flow of water through the second openings 240 of the wiper body 220.

When mounted within the basket body 110, the second end 228 of the wiper body 220 is seated on the bottom wall 114 within the basket body and the first end 226 of the wiper body 220 projects outwardly of the first end 120 of the basket body. The cap 222 is spaced above and at least partially overlies the seal 140, thereby covering the upper opening 124 of the basket body. With the first end 226 of the wiper body 220 extended out of the basket body 110, the first end of the wiper body is devoid of the second water openings 240, maximizing flow of the drain water into the basket body 110. Further, in cross-section of the drain protector 100 with the basket body 110 having a cylindrical shape and the wiper body 220 having an inverted conical shape, a space 270 defined between the sidewall 112 of the basket body 110 and the sidewall 224 of the wiper body 220 is conical shaped (see FIGS. 4 and 5).

Figure 6:
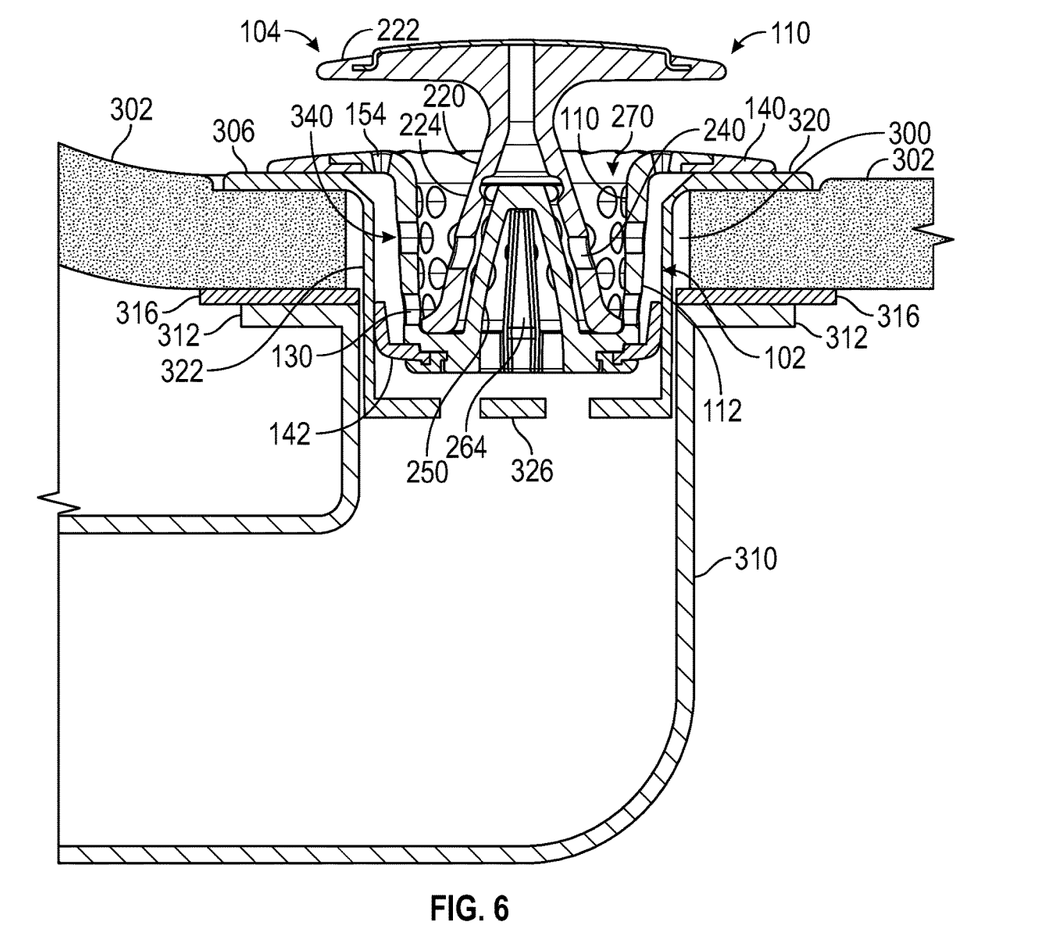
FIG. 6 is a cross-sectional view of the drain protector mounted in an associated drain of a shower or bathtub.

With reference to FIG. 6, the drain protector 100 is positioned in a drain 300 of a shower or bathtub 302. A drain flange 306 is typically mounted into the drain 300. The drain flange is connected to a drain pipe 310, which generally has a flange 312 adhered to an underside of the shower or bathtub via a gasket 316 interposed between. The drain flange 312 includes a flange 320 engaged to an outer surface of the shower or bathtub, a sidewall 322 extended into the drain 300 and the drain pipe 310, and a bottom wall 326 in the form of a lattice to filter and catch hair and other debris in the drain water. With the basket 102 positioned within the drain flange 312, the sidewall 112 of the basket body 110 is spaced inwardly from an inner surface of the sidewall 322 to define a passageway 340 between the basket 102 and the sidewall 322 for the flow of water through the first openings 130. The seal 140 directly sealingly engages at least one of the outer surface of the shower or bathtub and the flange 320 of the drain flange 312, and the retention member 142 directly engages the inner surface of the sidewall 322 of the drain flange to thereby center and retain the basket body 110 within the drain 300. It should be appreciated that the tabs 180 of the retention member 142 are configured to compress against the inner surface of the sidewall 322, thereby creating an interference fit between the basket 102 and the sidewall 322. The wiper 104 removably mounted to the basket 102 projects outwardly from the basket with the cap 222 spaced above the outer surface of the shower or bathtub 302. With the drain protector 100 sealingly engaged with the drain flange 306 (or the outer surface of the shower or bathtub), drain water flows through the drain openings 154, if provided on the first seal part 146 of the seal 140, directly into the passageway 340 and also separately flows into the space 270 of the drain protector 100 where the drain water circulates around the wiper body 220, flowing through the first openings 130 into the passageway 340 and also through the second openings 240 and the slotted openings 264. Hair and other debris in the drain water is trapped by the drain protector 100, hair wraps around the wiper 104 and will not be visible, unlike a traditional drain protector where hair stays on top of the drain. The wiper 104 can be removed from the basket 102 to remove the hair and other debris from within the basket body 110. The basket 102 can also be removed from the drain for cleaning.

According to the present disclosure, the basket body 110 is formed of a first material and the wiper body 220 is formed of a second material having a hardness less than the first material. By way of example, the first material is a nylon material and the second material is a rubber or silicone material. This differing material arrangement of the basket body and the wiper body allows for a more rigid basket to be placed within the drain and a more flexible wiper extended from the basket which may be contacted by the person during use of the shower or bathtub 302. Further, each of the seal 140 (particularly the second seal part 148) and the retention member 142 (particularly the tabs 180) of the basket 102 can be formed of a rubber, silicone of other similar flexible and water-impermeable material.

It will be appreciated that the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A drain protector comprising:
a basket including a basket body having first water openings, the basket body including a seal at an upper first end and a retention member at a lower second end opposite the upper first end relative to a longitudinal axis of the drain protector, wherein the basket body is sized to be received in an associated drain, the seal for directly sealingly engaging an outer surface of the associated drain, and the retention member for directly engaging an inner surface of the associated drain; and
a wiper including a wiper body including an upper first end and a lower second end opposite the first end relative to the longitudinal axis, the wiper body having second water openings, the wiper body removably mounted within the basket body for entrapping debris within water and removing the debris from within the basket body,
wherein the basket body includes a bottom wall and a sidewall extended upwardly from the bottom wall from the lower second end to the upper first end of the basket body, the sidewall forming an internal space with an upper opening for receiving the wiper, the sidewall of the basket body having the first water openings,
wherein the wiper body includes a sidewall extended between the upper first end and the lower second end of the wiper body, the sidewall of the wiper body having the second openings, the sidewall of the wiper body having an inverted conical shape in side view with the upper first end being narrower compared to the lower second end of the wiper body, and the wiper includes a cap at the first end.

2. The drain protector of claim 1, wherein the bottom wall has a mounting feature extended therefrom for mounting of the wiper body.

3. The drain protector of claim 2, wherein the mounting feature is a post extending from the bottom wall, a free end portion of the post adapted for engaging the wiper body.

4. The drain protector of claim 3, wherein the free end portion of the post includes at least one tab extended therefrom.

5. The drain protector of claim 4, wherein an inner surface of the wiper body has a groove formed therein for receiving the at least one tab.

6. The drain protector of claim 3, wherein the post includes at least one slotted opening for a flow of water through the basket body.

7. The drain protector of claim 3, wherein each of the wiper body and the post has an inverted conical shape in side view.

8. The drain protector of claim 1, wherein when mounted within the basket body the second end of the wiper body is seated within the basket body and the first end of the wiper body projects outwardly of the first end of the basket body, the cap spaced above and at least partially overlying the seal.

9. The drain protector of claim 8, wherein the first end of the wiper body is devoid of the second water openings.

10. The drain protector of claim 1, wherein when mounted within the basket body the second end of the wiper body is seated on the bottom wall and the first end of the wiper body projects outwardly of the first end of the basket body.

11. The drain protector of claim 1, wherein the retention member is defined by flexible tabs extended radially relative to the longitudinal axis of the drain protector, the tabs configured to compress against the inner surface of the associated drain.

12. The drain protector of claim 11, wherein the tabs are part of a separate ring member mounted to the second end of the basket body.

13. The drain protector of claim 1, wherein the basket body is formed of a first material and the wiper body is formed of a second material having a hardness less than the first material.

14. The drain protector of claim 13, wherein, the first material is a nylon material and the second material is a silicone material.

15. A drain protector covering a flange around an opening of an associated drain in an associated shower or bathtub and for straining hair out of drain water, the drain protector comprising:
a basket including a perforated basket body having an upper first end defining an upper opening and a lower second end opposite the upper first end relative to a longitudinal axis of the drain protector, the upper first end provided with a seal for sealingly engaging the drain flange of the associated drain and the lower second end provided with a retention member for engaging an inner surface of the associated drain; and
a wiper including a perforated wiper body having an upper first end and a lower second end opposite the upper first end relative to the longitudinal axis of the drain protector, the lower second end of the wiper body defining a lower opening, the wiper body received in the upper opening and removably mounted within the basket body for removing hair entrapped within the basket body, the wiper including a cap spaced above the upper first end of the basket body for covering the upper opening of the upper first end of the basket body,
wherein the basket body includes a bottom wall and a perforated sidewall extended from the bottom wall along the longitudinal axis,
wherein the wiper body includes a perforated sidewall extending along the longitudinal axis,
wherein the basket body includes an internal mounting feature for mounting of the wiper body within the basket body, the internal mounting feature received in the lower opening and includes a side wall with at least one opening for a flow of water through the side wall of the mounting feature.

16. The drain protector of claim 15, wherein the bottom wall having the mounting feature extended therefrom along the longitudinal axis of the drain protector.

17. The drain protector of claim 16, wherein the mounting feature is a post extended along the longitudinal axis of the drain protector with a free end portion having at least one tab extended therefrom for engaging the wiper body.

18. The drain protector of claim 17, wherein an inner surface of the sidewall of the wiper body has a groove formed therein for receiving the at least one tab.

* * * * *